US008077623B2

(12) United States Patent
Duller et al.

(10) Patent No.: US 8,077,623 B2
(45) Date of Patent: Dec. 13, 2011

(54) SIGNAL ROUTING IN PROCESSOR ARRAYS

(75) Inventors: Andrew William George Duller, Bristol (GB); William Philip Robbins, Bristol (GB)

(73) Assignee: PicoChip Limited, Bath (GB)

( * ) Notice: Subject to any disclaimer, the term of this patent is extended or adjusted under 35 U.S.C. 154(b) by 268 days.

(21) Appl. No.: 12/367,814

(22) Filed: Feb. 9, 2009

(65) Prior Publication Data
US 2009/0210652 A1  Aug. 20, 2009

(30) Foreign Application Priority Data

Feb. 11, 2008  (GB) .................................. 0802531.4

(51) Int. Cl.
G01R 31/08  (2006.01)

(52) U.S. Cl. ........ 370/238; 370/248; 370/252; 370/351; 370/389; 370/401; 326/37; 326/38; 326/39; 326/40; 326/41; 716/12; 716/13; 716/14; 716/16; 716/17

(58) Field of Classification Search .................. 370/238, 370/248, 252, 351, 389, 400, 401, 428; 326/37, 326/38, 39, 40, 41; 716/12, 13, 14, 16, 17
See application file for complete search history.

(56) References Cited

U.S. PATENT DOCUMENTS

| | | | | |
|---|---|---|---|---|
| 5,473,731 A * | 12/1995 | Seligson | ........................ | 706/28 |
| 5,861,761 A * | 1/1999 | Kean | ............................... | 326/41 |
| 6,069,490 A * | 5/2000 | Ochotta et al. | ................... | 326/41 |
| 6,101,599 A * | 8/2000 | Wright et al. | .................. | 712/228 |
| 6,167,502 A * | 12/2000 | Pechanek et al. | ............... | 712/15 |
| 6,173,386 B1 * | 1/2001 | Key et al. | ........................ | 712/10 |
| 6,448,910 B1 * | 9/2002 | Lu | ..................................... | 341/51 |
| 6,567,417 B2 * | 5/2003 | Kalkunte et al. | .............. | 370/428 |
| 6,961,782 B1 * | 11/2005 | Denneau et al. | .............. | 709/241 |
| 7,103,008 B2 * | 9/2006 | Greenblat et al. | ............. | 370/258 |
| 7,237,055 B1 * | 6/2007 | Rupp | ............................ | 710/317 |
| 7,428,721 B2 * | 9/2008 | Rohe et al. | ..................... | 716/138 |
| 7,549,081 B2 * | 6/2009 | Robbins et al. | .................. | 714/10 |
| 7,712,067 B1 * | 5/2010 | Fung et al. | ..................... | 716/126 |
| 7,801,029 B2 * | 9/2010 | Wrenn et al. | .................. | 370/225 |
| 7,804,719 B1 * | 9/2010 | Chirania et al. | ......... | 365/189.02 |
| 2004/0150422 A1 * | 8/2004 | Wong | .............................. | 326/41 |
| 2005/0114565 A1 * | 5/2005 | Gonzalez et al. | ............... | 710/36 |
| 2007/0263544 A1 * | 11/2007 | Yamanaka et al. | ............. | 370/238 |

FOREIGN PATENT DOCUMENTS

| | | |
|---|---|---|
| WO | 02/050624 A3 | 6/2002 |
| WO | 2004102989 A1 | 11/2004 |

OTHER PUBLICATIONS

Search Report for GB0802531.4 dated Jun. 11, 2008.

* cited by examiner

*Primary Examiner* — Ayaz Sheikh
*Assistant Examiner* — Andrew C Lee
(74) *Attorney, Agent, or Firm* — Alston & Bird LLP

(57) ABSTRACT

There is provided a method for routing a plurality of signals in a processor array, the processor array comprising a plurality of processor elements interconnected by a network of switches, each signal having a respective source processor element and at least one destination processor element in the processor array, the method comprising (i) identifying a signal from the plurality of unrouted signals to route; (ii) identifying a candidate route from the source processor element to the destination processor element, the candidate route using a first plurality of switches; (iii) evaluating the candidate route by determining whether there are offset values that allow the signal to be routed through the first plurality of switches; and (iv) attempting to route the signal using one of the offset values identified in step (iii).

24 Claims, 6 Drawing Sheets

Route 00: 0 1 1 1 1 1 0 0 0 0 right down down down down down right right right right
Route 01: 0 1 1 1 1 0 1 0 0 0 right down down down down right down right right right
Route 02: 0 1 1 1 0 1 1 0 0 0 right down down down right down down right right right
Route 03: 0 1 1 0 1 1 1 0 0 0 right down down right down down down right right right
Route 04: 0 1 0 1 1 1 1 0 0 0 right down right down down down down right right right
Route 05: 0 0 1 1 1 1 1 0 0 0 right right down down down down down right right right
Route 06: 0 1 1 1 1 0 0 1 0 0 right down down down down right right down right right
Route 07: 0 1 1 1 0 1 0 1 0 0 right down down down right down right down right right
Route 08: 0 1 1 0 1 1 0 1 0 0 right down down right down down right down right right
Route 09: 0 1 0 1 1 1 0 1 0 0 right down right down down down right down right right
Route 10: 0 0 1 1 1 1 0 1 0 0 right right down down down down right down right right
Route 11: 0 1 1 1 0 0 1 1 0 0 right down down down right right down down right right
Route 12: 0 1 1 0 1 0 1 1 0 0 right down down right down right down down right right
Route 13: 0 1 0 1 1 0 1 1 0 0 right down right down down right down down right right
Route 14: 0 0 1 1 1 0 1 1 0 0 right right down down down right down down right right
Route 15: 0 1 1 0 0 1 1 1 0 0 right down down right right down down down right right
Route 16: 0 1 0 1 0 1 1 1 0 0 right down right down right down down down right right
Route 17: 0 0 1 1 0 1 1 1 0 0 right right down down right down down down right right
Route 18: 0 1 0 0 1 1 1 1 0 0 right down right right down down down down right right
Route 19: 0 0 1 0 1 1 1 1 0 0 right right down right down down down down right right
Route 20: 0 0 0 1 1 1 1 1 0 0 right right right down down down down down right right
Route 21: 0 1 1 1 1 0 0 0 1 0 right down down down down right right right down right
Route 22: 0 1 1 1 0 1 0 0 1 0 right down down down right down right right down right
Route 23: 0 1 1 0 1 1 0 0 1 0 right down down right down down right right down right
Route 24: 0 1 0 1 1 1 0 0 1 0 right down right down down down right right down right
Route 25: 0 0 1 1 1 1 0 0 1 0 right right down down down down right right down right
Route 26: 0 1 1 1 0 0 1 0 1 0 right down down down right right down right down right
Route 27: 0 1 1 0 1 0 1 0 1 0 right down down right down right down right down right
Route 28: 0 1 0 1 1 0 1 0 1 0 right down right down down right down right down right
Route 29: 0 0 1 1 1 0 1 0 1 0 right right down down down right down right down right
Route 30: 0 1 1 0 0 1 1 0 1 0 right down down right right down down right down right
Route 31: 0 1 0 1 0 1 1 0 1 0 right down right down right down down right down right
Route 32: 0 0 1 1 0 1 1 0 1 0 right right down down right down down right down right
Route 33: 0 1 0 0 1 1 1 0 1 0 right down right right down down down right down right
Route 34: 0 0 1 0 1 1 1 0 1 0 right right down right down down down right down right
Route 35: 0 0 0 1 1 1 1 0 1 0 right right right down down down down right down right
Route 36: 0 1 1 1 0 0 0 1 1 0 right down down down right right right down down right
Route 37: 0 1 1 0 1 0 0 1 1 0 right down down right down right right down down right
Route 38: 0 1 0 1 1 0 0 1 1 0 right down right down down right right down down right
Route 39: 0 0 1 1 1 0 0 1 1 0 right right down down down right right down down right
Route 40: 0 1 1 0 0 1 0 1 1 0 right down down right right down right down down right
Route 41: 0 1 0 1 0 1 0 1 1 0 right down right down right down right down down right
Route 42: 0 0 1 1 0 1 0 1 1 0 right right down down right down right down down right
Route 43: 0 1 0 0 1 1 0 1 1 0 right down right right down down right down down right
Route 44: 0 0 1 0 1 1 0 1 1 0 right right down right down down right down down right
Route 45: 0 0 0 1 1 1 0 1 1 0 right right right down down down right down down right
Route 46: 0 1 1 0 0 0 1 1 1 0 right down down right right right down down down right
Route 47: 0 1 0 1 0 0 1 1 1 0 right down right down right right down down down right
Route 48: 0 0 1 1 0 0 1 1 1 0 right right down down right right down down down right
Route 49: 0 1 0 0 1 0 1 1 1 0 right down right right down right down down down right
Route 50: 0 0 1 0 1 0 1 1 1 0 right right down right down right down down down right
Route 51: 0 0 0 1 1 0 1 1 1 0 right right right down down right down down down right
Route 52: 0 1 0 0 0 1 1 1 1 0 right down right right right down down down down right
Route 53: 0 0 1 0 0 1 1 1 1 0 right right down right right down down down down right
Route 54: 0 0 0 1 0 1 1 1 1 0 right right right down right down down down down right
Route 55: 0 0 0 0 1 1 1 1 1 0 right right right right down down down down down right

Figure 5

SIGNAL ROUTING IN PROCESSOR ARRAYS

TECHNICAL FIELD OF THE INVENTION

This application claims the benefit of priority from British Patent Application No. 0802531.4 filed in the United Kingdom on Feb. 11, 2008. The subject matter of this application is incorporated herein by reference.

The invention relates to the routing of signals in a processor array, and in particular to a method and apparatus for determining the routing of signals in a time-division multiplexed switching architecture.

BACKGROUND TO THE INVENTION

Processor arrays that contain a number of separate but interconnected processor elements are known. One such processor array is the picoArray™ architecture produced by the applicant of the present application and described in International publication WO 02/50624. In the picoArray™ architecture, the processor elements are connected together by a proprietary bus that includes switch matrices.

The software description of a digital signal processing (DSP) system comprises a number of processes that communicate with point-to-point or point-to-multipoint signals. Each signal has a fixed bandwidth, known as its slot rate, which has a value that is a power of two in the range 2-1024, in units of the picoArray™ cycle. Thus, a slot rate of four means that slots must be allocated on the bus between a sending processor element and the receiving processor element(s) once every four system clock cycles.

A partitioning procedure can be used to allocate groups of processes to each of the processor arrays in the system. A placement procedure can be used to allocate each process to a specific processor element within its allocated processor array. A switching or routing procedure determines the multiplexing of the signals on to the physical connections of the bus in the processor array.

The placement and switching procedure takes a user's abstract design, which consists of processes and signals, and places each process onto a processor element on a picoArray™ and routes all of the signals using the switching matrix of the picoArray™. This procedure must be carried out in a way that maximizes the number of processor elements that can be used within a given picoArray™ and that minimises the length of the routing needed for the signals.

The placement and the routing steps are generally performed separately, for example a candidate placement is created and then the signals are routed using that placement.

The output of the placement and switching procedure is a "load file" which contains configuration data for a single picoArray™.

The present application is concerned with the procedure for routing the signals. Therefore, in the following, it is assumed that the placement procedure has been carried out, i.e. the mapping of the processes to the processor elements has been completed.

The proprietary bus used in picoArrays™ is a time division multiplexed (TDM) structure in which communication timing is determined at "compile time". In other words, there is no dynamic arbitration.

The bus comprises a set of "switches" placed throughout the processor array, and these switches are either in-line with the processor elements (see FIG. 1 (a)), or offset (see FIG. 1(b)).

In-line switches are easier to use for placement and routing algorithms since the regularity makes it easier to compute distances between processor elements. With offset switches, each row of processor elements is connected to two rows of switches, and therefore it is possible to communicate between adjacent rows by only traversing one switch, whereas in-line switches require the traversal of two switches.

However, for offset switches, each processor element is connected to two bus connections and only one of these can be used to provide this single switch transfer. If that direction becomes blocked (perhaps by another signal) then the other direction must be used, and this requires the traversal of three switches. For in-line switches, the two possible directions both require the traversal of two switches.

Thus it is easier to predict "bus costs" before the routing is actually performed if in-line switches are used.

The routing procedure requires a tool that can determine the contents of routing tables within each of the switches that make up the picoBus structure from the signals that need to be routed. Each routing table consists of a set of entries that indicate the routing for each clock cycle. The set of entries are repeated every N clock cycles. In addition, it is possible for some of the entries to be repeated at a lower frequency to provide communications at lower rates, while reducing the size of routing tables that are required.

In currently available picoArrays™, N is 1024. This is implemented as a table of 124+(4×8) entries. The main part of the table, which comprises the 124 entries, is repeated once every 128 clock cycles. The 8 blocks of 4 entries are repeated every 1024 clock cycles and are known as the "hierarchical" entries.

Furthermore, as indicated above, the routing of signals has to handle two cases that are supported by the bus protocol, namely point-to-point communications and point-to-multipoint communications.

SUMMARY OF THE INVENTION

According to a first aspect of the invention, there is provided a method for routing a plurality of signals in a processor array, the processor array comprising a plurality of processor elements interconnected by a network of switches, each signal having a respective source processor element and at least one destination processor element in the processor array, the method comprising (i) identifying a signal from the plurality of unrouted signals to route; (ii) identifying a candidate route from the source processor element to the destination processor element, the candidate route using a first plurality of switches; (iii) evaluating the candidate route by determining whether there are offset values that allow the signal to be routed through the first plurality of switches; and (iv) attempting to route the signal using one of the offset values identified in step (iii).

Further aspects provide computer programs and a computer program product for performing the above method on a computer.

BRIEF DESCRIPTION OF THE DRAWINGS

Preferred embodiments of the invention will now be described, by way of example only, with reference to the following Figures, in which:

FIG. 5 shows a bit notation used to represent routes through a switch matrix;

DETAILED DESCRIPTION OF THE PREFERRED EMBODIMENTS

Although the invention will be described with reference to the picoArray™ processor array designed and manufactured by the applicant for this patent application, it will be appreciated that the invention is applicable to other types of multi-processor arrays.

As described above, the routing tool determines the contents of the routing tables for each of the switches that make up the bus structure. The routing within each table is preferably described uniquely by three pieces of information for each signal. These are:

the rate of transfer, R, required for the signal (currently this must be a power of 2 between 2 and 1024 inclusive);

the offset (or phase) at which signals are routed; and the number of clock cycles, C, required to complete the transfer (this is determined by the length of the picoBus traversed).

For example, a signal with a rate of 4, an offset of 1 and number of clock cycles equal to 2 will occupy the bus on cycle 1, 2, 5, 6, 9, 10, 13, 14 etc. It will be noted here that each pair of entries provides a single communication, but in general, each transfer requires C consecutive entries to be reserved in the table. For signals with rates between 2 and 128 inclusive, the offset can be anything from 0 to "rate-1". For a signal with a rate between 256 and 1024, the offsets are more limited since they must be stored in the "hierarchical" part of the routing table. In addition, the current implementation of the picoBus places a constraint on the value of C, namely that C must be less than R. For example, a signal with a rate of 2 will only permit a single cycle transfer.

In accordance with the invention, each signal to be routed in the processor array is considered and routed separately. It is important to select routes for the signals in the correct order if a complete solution for a congested design is to be found. As a result, the signals are ranked in order of "routability" which takes into account various factors or criteria. In particular, the routability depends on the connectivity present in the processor array. For example, the routability of a signal can take into account the data rate of the signal, the estimated length of the signal path or multipaths and/or the number of offsets that are available for the given data rate.

Figure 1:
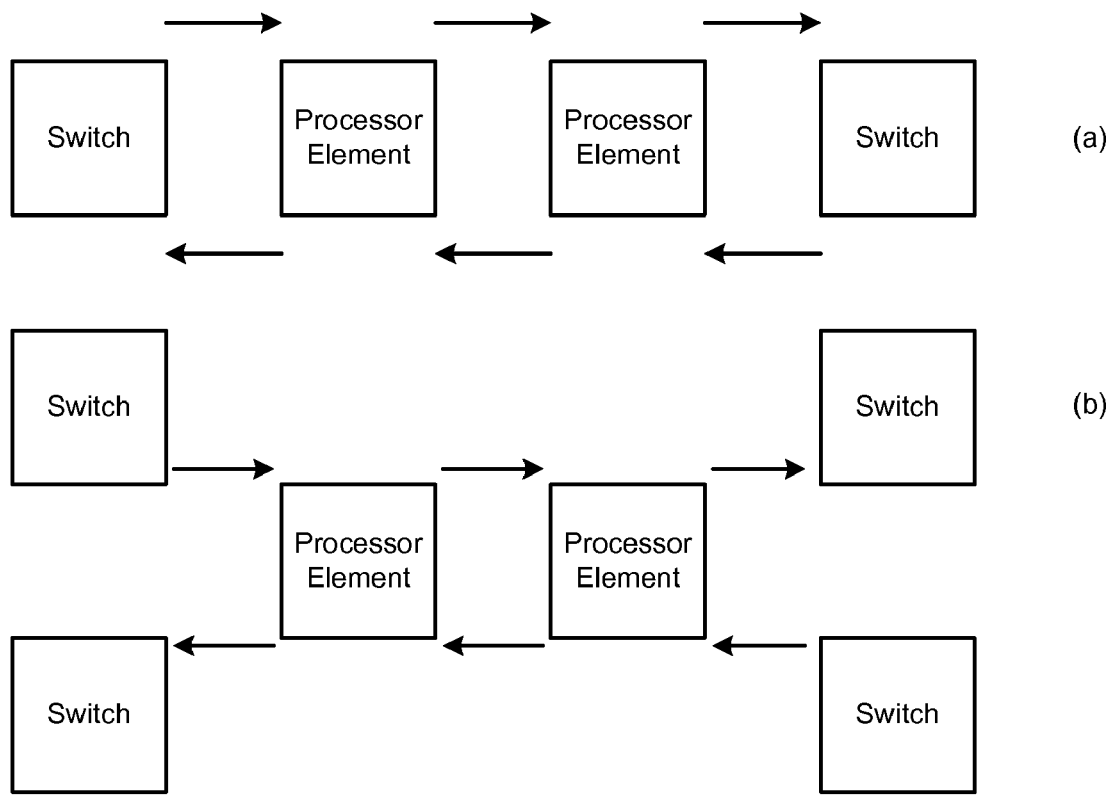
FIG. 1 shows bus switches in line with processor elements (FIG. 1(a)) and offset from the processor elements (FIG. 1(b))
Figure 2:
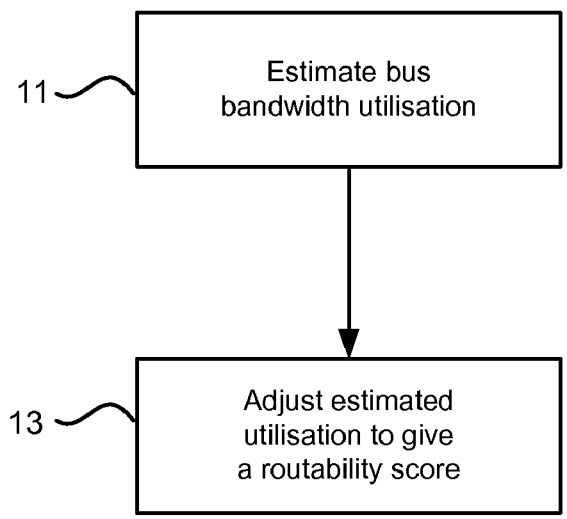
FIG. 2 shows a method of calculating a routability score for a signal in accordance with the invention.

In a preferred embodiment of the invention, the routability of a signal is determined in accordance with the method shown in FIG. 2. In step 11, the bus bandwidth utilisation for the signal is estimated. This is the sum of the bus bandwidth used by each path of the signal (if the signal is a point-to-multipoint signal) to the individual destination processor elements. However, this sum will overestimate the bandwidth due to shared parts of the path being counted multiple times.

In general, for a given signal path from a source processor element to a destination processor element, the bus bandwidth, bw="slots"* C * "segments" where "slots" is the number of slots required, as determined by the rate of the signal; C is the number of clock cycles the signal must stay on the bus for each transfer; and "segments" is the number of bus segments traversed plus the number of switches traversed.

This estimated bus bandwidth utilisation is then adjusted to give a routability score. In particular, the estimated utilisation is adjusted to account for signals with few available offsets and few available routes. In a preferred implementation, the following heuristics are used. If there is a single possible route, the estimated utilisation is multiplied by 2 to give the routability score; if there are eight or less offsets, the utilisation is multiplied by 1 to give the routability score; otherwise the utilisation is multiplied by 0.9 to give the routability score.

Figure 3:
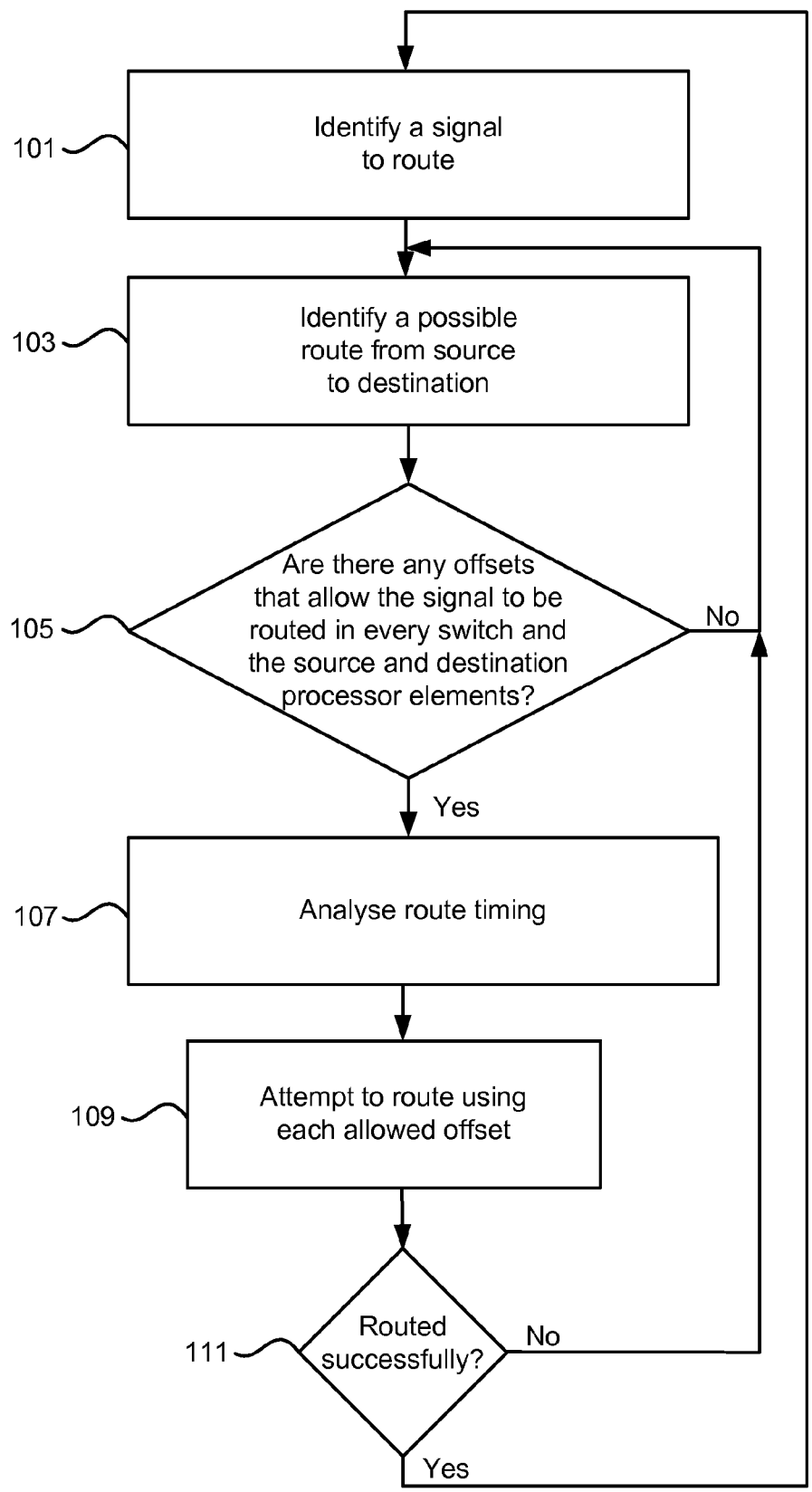
FIG. 3 shows a method in accordance with the invention.

FIG. 3 outlines the method of routing a signal in accordance with the invention. The first step of the method comprises identifying a signal to route (step 101). This step involves ranking the signals in order of routability, and selecting the signal that is the least routable (i.e. has the highest routability score) for consideration first.

The second step of the method comprises identifying a possible route that could be used to route that signal from the source processor element to the destination processor element (step 103). Each possible route will comprise a combination of switches that need to be traversed in order for the signal to arrive at the destination processor element.

It should be noted that the algorithm does not determine all of the possible routes at once in step 103, but instead the algorithm determines and evaluates one route in each iteration of step 103. Thus, in step 103, one possible route is identified, and the switches used in this route are identified.

As described further below, in the first few iterations of step 103, the routes identified will be minimum distance routes, i.e. those routes that take the least number of steps from the source processor element to the destination processor element.

Furthermore, the particular route chosen will be one that minimises the amount of "local" routing used. "Local" routing is defined as those bus segments that connect directly to processor elements, whereas "global" routing is defined as those bus segments that connect from switch to switch. Thus, the routes which maximise the use of "global" routing will be chosen ahead of those with more "local" routing.

Although the specific routes may not be calculated in step 103, the total number of minimum distance routes can be calculated at this stage, and the specific calculation used to determine this will depend on the type of array connectivity present (for example whether there are in-line or offset switches).

As described further below, if a given route provides a solution for this particular signal, then no more routes are generated and evaluated. However, if in later iterations of step 103 all of the minimum distance routes have been evaluated and a solution has not been found, then step 103 can consider non-minimum distance routes. In this case, step 103 first considers routes that are the minimum distance plus one switch, then routes that are the minimum distance plus two switches, and so on.

Once a possible route has been identified, it is determined whether there are any values for the offset that allow the signal to be routed through every switch along the selected route from the source processor element to the destination processor element (step 105). In other words, for the selected route, it is determined whether there are free entries in the routing tables of each switch along the route. Any offset for which one or more of the required switches do not have a free entry in the routing table is discarded.

If there are no valid values for the offset for the route selected in step 103, the algorithm returns to step 103 and another possible route is selected.

If there are one or more valid values for the offset, the algorithm moves to step 107.

The distance that a signal can traverse in a clock cycle is determined by the silicon timing information for the specific route that is being used. When a route has been identified as having appropriate slots free in the routing tables of all of the relevant switches, a specific timing analysis is done for that route (step 107), and this determines how many clock cycles the transfer will take.

It should be noted that a route timing analysis only needs to be performed once for each route, as different values for the offset do not affect the route timing.

In many cases, this analysis will provide a result that agrees with values that have been pre-calculated for general routes of a length corresponding to that of the chosen route. In this case, it can be guaranteed that the signal is routable on the chosen route. As described further below, these pre-calculated values can be stored in a sustain cache. If the transfer time is longer than expected, then the routing may fail, in which case it is necessary for the other routes to be tried.

After the route timing has been analysed, the algorithm moves to step 109 in which a routing of the signal is attempted for each offset found in step 105. If the route timing analysis agrees with the pre-calculated value, the signal is guaranteed to be routable using any offset in the chosen route. If the transfer time is longer than expected, then the routing using a specific offset may fail, in which case it is necessary for the other offsets found in step 105 to be considered.

The order in which offsets are evaluated is determined to minimize the possible congestion for signals with small numbers of offsets and to avoid fragmentation of the routing tables. For example, a signal with a rate of 16 could have an offset of 0 to 15, and assuming that any of these is in fact possible for a given signal, there should be a preference for avoiding any offsets that are "hierarchical" slots, since this may limit the routing of the slowest signals. Thus, in this example, the offsets 0 to 3 would be avoided and would only be used if no other offset were possible.

In step 111, it is determined whether the signal has been routed successfully for each of the allowed offsets. If not, the algorithm returns to step 103 and an alterative route is identified.

If desired, a limit can be placed on the number of times that the algorithm can return to step 103 to select an alternative route for any particular signal. Alternatively, in the absence of a limit, the algorithm can continue until all possible routes for a signal have been considered.

If either the limit is reached, or all routes have been considered, the algorithm can output an error condition for the relevant signal, indicating that it is not possible to route the signal.

However, if the signal has been routed successfully (i.e. an offset has been assigned to the signal on the selected route), the algorithm returns to step 101, and the next least-routable signal is selected for consideration.

Figure 4:
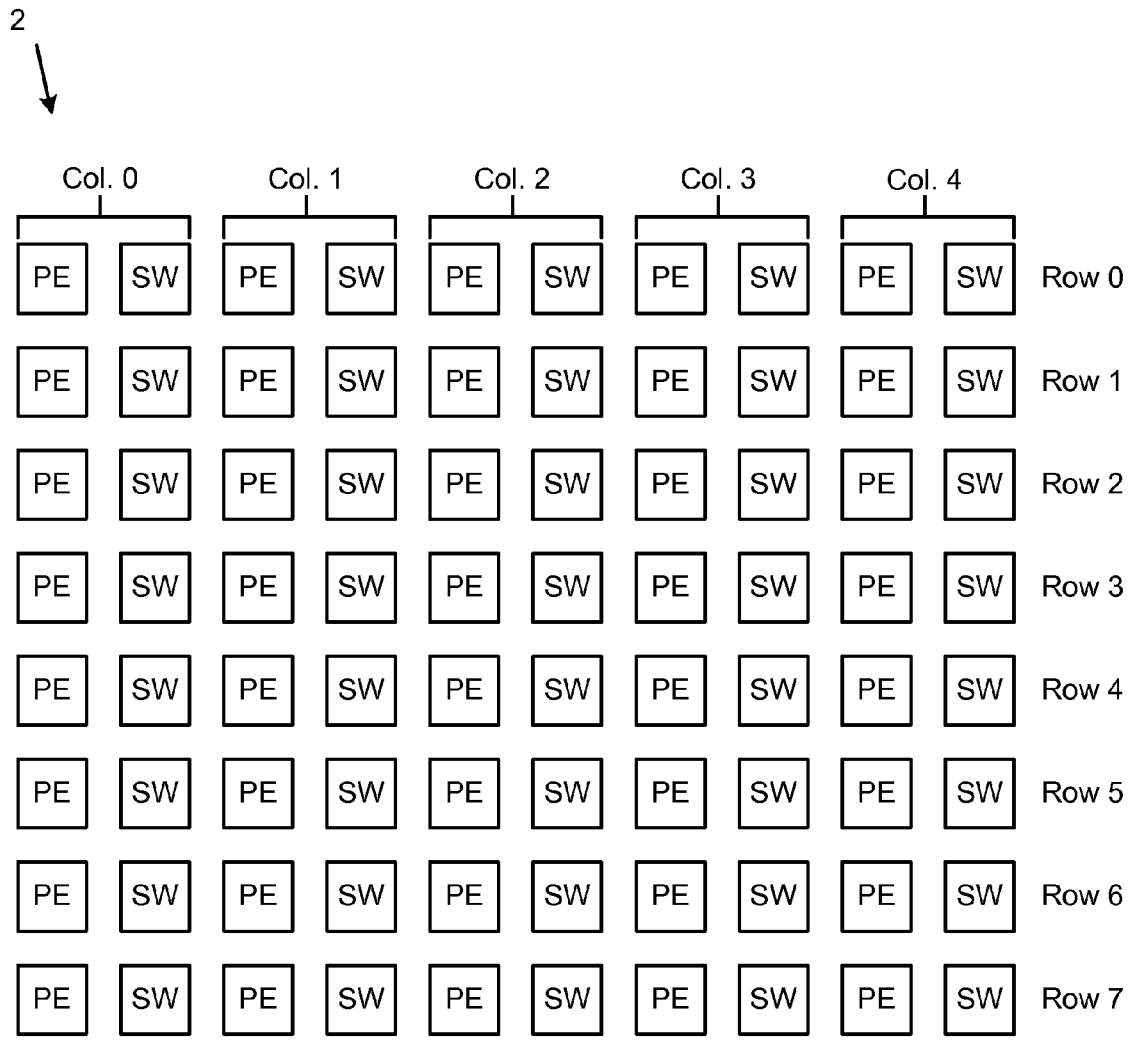
FIG. 4 shows an exemplary processor array.

The second step of the method in FIG. 3 will now be described in more detail with reference to FIGS. 4 and 5, which shows an exemplary processor array 2. The processor array 2 comprises a plurality of processor elements (labeled "PE") each having an associated switch (labeled "SW"). The switches SW form the bus of the processor array 2 that allow signals to be routed from any of the processor elements PE to any of the other processor elements PE in the array 2.

As the processor array 2 is regular, i.e. the processor elements PEs are arranged in columns and rows, minimum distance routes can be easily identified for each signal. Each signal will have a source processor element PE (the processor element that generates the signal) and at least one destination processor element PE.

Consider a signal originating from the processor element in column 0 and row 1 of the processor array 2, with the destination processor element being in column 4, row 6.

Two parts of the route between the source processor element and the destination processor element are the same, regardless of the relative positions of the processor elements and the specific route chosen, unless the source and destination processor elements are in the same site group (in which case the signal does not go through any switches at all). These are the first "hop" from the source processor element to the switch in column 0, row 1, and the last "hop" from the switch in column 3 row 6 to the destination processor element. In other words, the route must go horizontally (i.e. along a row) from the source processor element to the first switch and from the last switch to the destination processor element.

The algorithm can determine the number of "minimum distance" routes between the source processor element and the destination processor element (or really, the minimum distance route between the switch adjacent to the source processor element and the switch adjacent to the destination processor element). Thus, it can be seen that each of the minimum distance routes will involve five "vertical" hops (i.e. down a column) and three horizontal hops between the switches—eight hops in total.

The algorithm uses a bit notation to represent each minimum distance route, with each bit indicating either a horizontal or vertical hop. Since a minimum distance between two processor elements in the array must be monotonic in the direction taken by the route (i.e. either left or right, and either up or down), the route can be represented using the bit notation, with the actual direction (up/down, left/right) being stored separately.

FIG. 5 shows all of the possible minimum distance routes that a signal can take between the source processor element in column 0, row 1 and the destination processor element in column 4, row 6 of the processor array 2. Thus, it can be seen that an 8-bit pattern is required to represent all (56) of the minimum distance routes for this signal. Although 10 bits are shown for each route in FIG. 5, it will be recognised that the first and last bits are both 0, corresponding to the horizontal hop from the source processor element and the hop to the destination processor element, so it is not necessary to store these in the bit pattern. Although all of the minimum distance routes are shown in FIG. 4, the algorithm does not calculate all of these routes at the same time, only one of these routes when step 103 is performed.

If it is necessary to determine non-minimum distance routes, a similar technique to the above can be used. However, in this instance, the hops along the columns and rows will not be monotonic, so the bit notation cannot be used directly.

Instead, a source processor element and/or destination processor element are effectively moved away from their actual positions by introducing a virtual source processor element or destination processor element.

For example, consider a signal to be routed from the processor element in column 1, row 1 to the processor element in column 3, row 3. If you want to consider a route with a non-minimum distance, the processor element at, say, column 0, row 0 can be considered to be a "virtual" source processor element. Thus, as the virtual source element is further from the actual source element, the algorithm can then determine the minimum distance routes between the virtual source element and the destination element. The full route between the actual source processor element and the destination processor element will be the concatenation of the route from the actual processor element to the virtual source processor element (also calculated using the minimum distance algorithm) and the route from the virtual source processor element to the destination processor element.

In general, if the source processor element is at position (srcCol, srcRow) and the destination processor element is at position (dstCol, dstRow) where dstCol>srcCol and dstRow>srcRow, the virtual source processor element (which is further away from the destination processor element than the actual source processor element) can be placed in position (srcCol−n, srcRow−m), where n and m are integers, provided that the position of the virtual source processor element is within the boundary of the processor array 2. An analogous method can be used with virtual destination processor elements to provide yet further routes.

In a preferred implementation, the minimum distance route is stored using a 32-bit unsigned integer value, and this is large enough to accommodate processor arrays 2 in which the total of the number of columns and number of rows is equal to or less than 32.

For multi-destination signals (i.e. point-to-multipoint signals), the minimum distance algorithm can be used to identify routes for each destination processor element.

Figure 6:
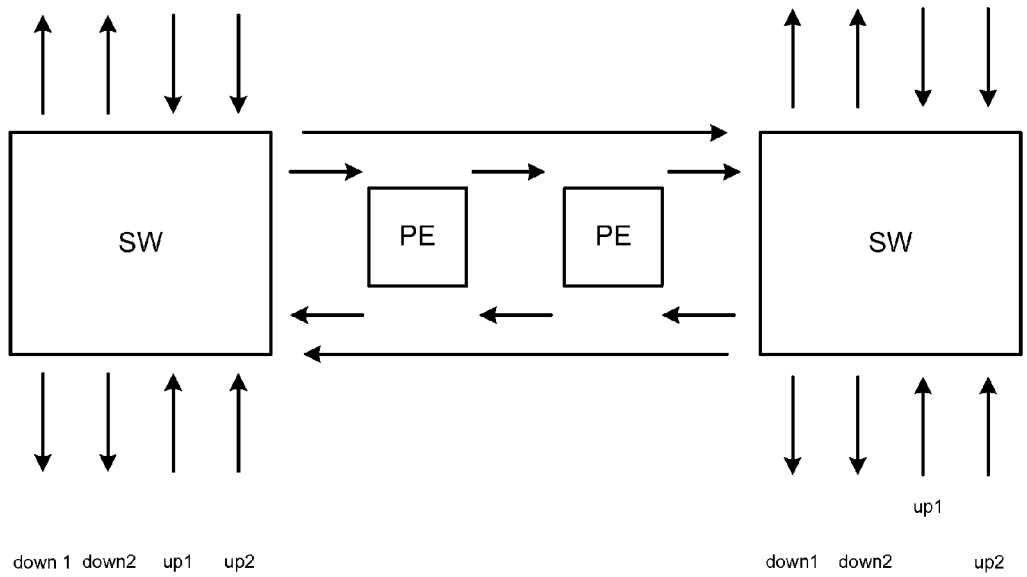
FIG. 6 shows a multi-bus connection between two switches.

In some processor arrays, the bus structure can comprise pairs of buses connecting each switch in each possible direction, as shown in FIG. 6. Furthermore, it is possible for the bus structure to have any number of buses connecting each switch.

In the general bus-pair case, the minimum distance algorithm described above needs to be extended, as there are now $2^{m-2}$ combinations for each minimum distance route, where m is the number of hops required of a signal on a given route (i.e. source to switch to switch to destination gives m a value of 3). It should be noted that it is "m−2" as the first and last hops have to be on the local bus to the nearest switch. In other words, for a given route using a set of switches between a source processor element and a destination processor element, there will be $2^{m-2}$ variations of that route using the various buses between those switches. For an array with N buses leaving each switch, the number of possible routes will be $N^{m-2}$.

For example, for a route that comprises "left, up, left, left", there are four possible combinations for pairs of buses between each switch:
left1, up1, left1, left1
left1, up2, left1, left1
left1, up1, left2, left1
left1, up2, left2, left1

The first and last directions must use the "left1" bus as they are the only buses connected directly to the processor elements in the architecture of FIG. 6. As a result, the left and right "1" buses must be used for local transfers (i.e. those routes that do not traverse any switches) and the "2" buses should be used initially to reduce local transfer congestion.

As indicated above, the minimum distance and non-minimum distance algorithms described above (and in particular where there is more than one bus connecting each switch or processor element, where the source and destination processor elements are widely separated and/or where there is "multipoint fan-out") can result in a very large number of possible routes being generated, so it is desirable to reduce this number in some cases.

Therefore, in preferred embodiments, heuristics can be used to determine how many of the possible routes between the source processor element and the destination processor element will be searched.

For a route using a given set of switches, there are a number of combinations of the local and global buses. A limit, $C_{limit}$, can be placed on the number of combinations of these buses that will be searched through the repetition of steps 103 to 109 of FIG. 3. In a preferred embodiment, $C_{limit}$ is set to 16. In current picoArrays, for a route involving three switches, the route can be viewed in terms of the local/global buses:

Source processor element (local)->switch (local or global)->switch (local or global)->switch (local)->destination processor element Here, "(local)->" means traverse the local bus and "(local or global)->" means traverse either the local or the global bus.

Thus there are $2^{(4-2)}=4$ combinations of local and global buses that can be chosen for this given set of switches.

For each path of a point-to-multipoint signal, the number of routes (i.e. number of possible combinations of switches), S, is calculated, and, assuming that the number of combinations of local and global buses, C, is the same for each route, the total number of possible routes for this path, P, is given by P=S*C.

For a given signal, the value of P for each path is calculated, and these are multiplied together to give the number of routes for the signal. This is then capped by $S_{limit}$, and in a preferred embodiment, $S_{limit}$ is set to 5000 to provide a trade off between execution time and quality of search.

When these limits are exceeded, the number of routes searched must be reduced. This can be done by arbitrarily capping the number of routes by using the first $S_{limit}$ routes that are evaluated (this is always done for single path routes). Alternatively, it can be done by capping those multipath routes that have the largest number of combinations so that $S_{limit}$ is approximately met. Alternatively, it can be done by reducing the number of combinations considered for each multipath route so that $S_{limit}$ is approximately met.

The method in step 105 of FIG. 3 will now be described in more detail. As mentioned above, each routed signal will have an assigned "offset", which will indicate the number of clock cycles into the N clock cycles that the signal is first transmitted. For a signal to be routable along a given route, it will be necessary to find an offset that is unoccupied through all of the switches in the route. Thus, step 105 aims to identify the possible offset values for the selected route (i.e. an offset for which there are corresponding entries in the relevant routing tables).

In a preferred embodiment, step 105 comprises identifying all of the possible offsets for a signal (which can be obtained by examining the data rate of the signal), and removing each offset from the list that is unavailable in one or more of the switches along the route. An offset will be unavailable if it has already been assigned for use by another signal.

If there are any offsets remaining in this reduced list after this analysis has been performed, one of the offsets in the reduced list can be selected for use by the signal, as described above with reference to step 109 of FIG. 3.

For a point-to-multipoint signal, it is necessary to identify an offset or offsets that are valid for each of the different paths the signal must take to the respective destination processor elements. If there is more than one offset in the reduced list then the offset to use for the signal can be selected arbitrarily—although if lower offsets are available, it is preferred that these are not chosen as they are "hierarchical" entries that can be used by the very low data rate signals.

The process shown in FIG. 3 will continue until either all of the signals have been routed (i.e. a full solution for the processor array has been found), or the algorithm fails to find a route for a signal.

If the algorithm fails to find a minimum distance route for a signal then the algorithm can consider whether it is possible to use a non-minimum distance route for the signal. These routes can be determined as described above.

Figure 7:
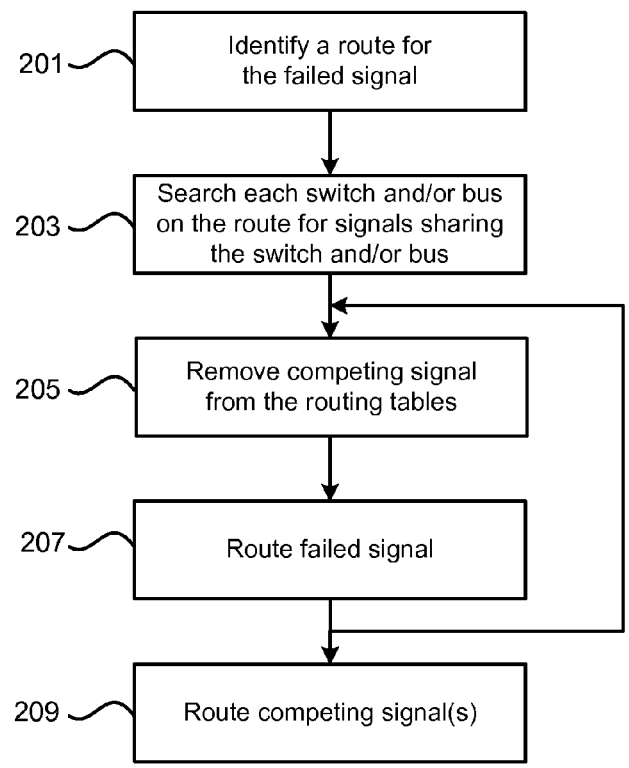
FIG. 7 is a flow chart of another method in accordance with the invention.

If this still fails to find a route for a signal, then one or more of the previously routed signals may be causing the failure. In this case, the signal and the previously routed signal are competing signals and the algorithm proceeds as shown in FIG. 7.

For the signal that failed to be routed, the first minimum distance route for that signal is selected (step 201), and each switch (and bus if applicable) along that route is searched for any signals that share the switch or bus (step 203). Any signals thus identified will be termed competing signals.

In step 205, the competing signal or signals are then removed from the routing tables of the switches one signal at a time (which is termed a back track operation). The removed signals are added to the list of remaining signals to be routed. The algorithm then tries to route the failed signal (step 207). It should be noted that step 207 comprises performing the method in steps 103-111 in FIG. 3 described above.

If it is still not possible to route the failed signal, the process returns to step 205 in which a further competing signal is removed.

Once the failed signal is successfully routed, the signals removed from the routing tables can be rerouted (step 209), which again comprises performing the method in FIG. 3 on those signals.

The process in FIG. 7 continues until either a maximum number of back track operations have been performed, or all signals are routed. If the maximum number of back track operations is reached then the routing has failed for the current placement.

The placement and routing tool evaluates a maximum number of placements (for example 30) which produce a failure to route, before reporting the design as a failure.

In the event the tool reports a failure, some limited output information can be provided to a user of the tool that may allow them to determine how the failure can be overcome.

For example, during placement, if it is not possible to produce a placement that passes all of the constraints due to bandwidth requirements on a site or on a site group, then these failures can be presented to the user.

In addition, when routing fails, it is possible to route all of those signals that will route, and then list all of the signals that remain. If this is repeated for each placement, then it may become clear that certain signals cannot be routed, regardless of the particular placement.

In further embodiments of the invention, step 109 of FIG. 3 can use a technique to reduce the fragmentation of the routing tables.

The routing of an individual signal may require more than one clock cycle to pass from the source processor element to the destination processor element, and in this case the routing requires more than one entry in the routing tables. For example, a signal with a data rate of 8 and an offset of 2 would normally occupy cycles 2, 10, 18, 26 etc., but if this signal actually requires three clock cycles to pass from the source to the destination, then the route must be maintained for those three cycles and it would actually occupy cycles (2, 3, 4), (10, 11, 12), (18, 19, 20), (26, 27, 28) etc.

A consequence of these multi-cycle transfers is that it is possible for the routing tables to become congested, even when they are not full (fragmentation). For example, if every other cycle is used for single cycle signals (i.e. the table is only half full), then no multi-cycle signals can be added to that switch or bus. If the single cycle signals had been grouped more appropriately, it would have allowed the flexibility to add multi-cycle signals.

Thus, in this embodiment of the invention, the algorithm assigns a score for each offset that is routable for a given route. In other words, each individual offset within a routing table that can be occupied by the current signal is given a score based on the proximity of the current signal to other routed signals in the table. In one embodiment, the score can indicate how many signals will be directly adjacent to the current signal (i.e. 0, 1 or 2), with the algorithm selecting an offset that gives the largest possible score.

Figure 8:
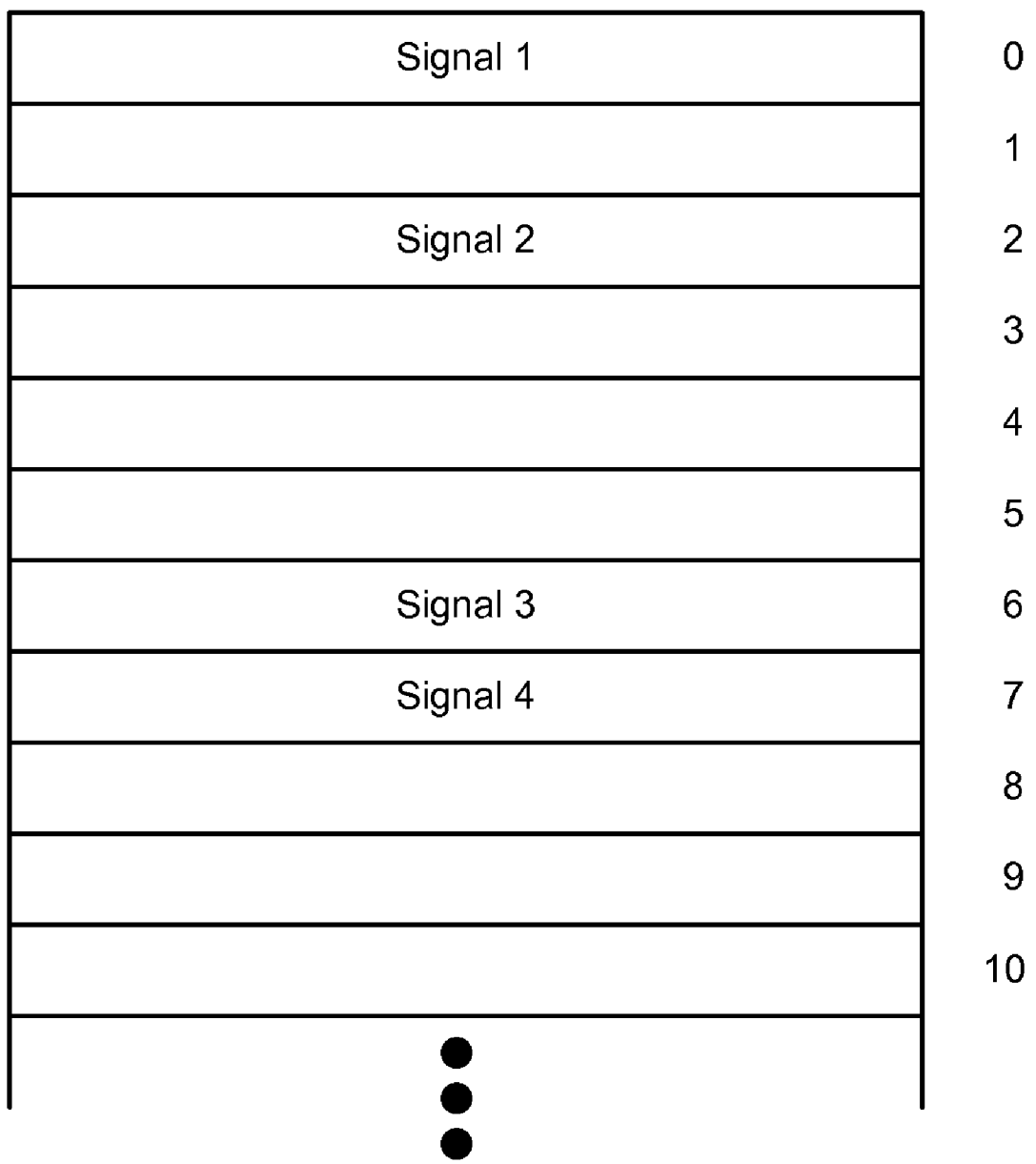
FIG. 8 shows an exemplary routing table.

FIG. 8 illustrates an exemplary routing table in a switch. Using the above scoring system, a single cycle signal with offset 1 will have a score of 2, a single cycle signal with offset 3, 5 or 8 will have a score of 1 and a single cycle signal with offset 4, 9 or 10 with have a score of 0. Therefore, the algorithm will prefer to assign an offset of 1 to the current signal.

The timing of data communications within a processor array 2 is vital to the performance of the data transfer, and, due to the size of many processor arrays, it will not in general be possible to perform an arbitrary communication in a single clock cycle. Therefore, the signal must be "sustained" on the bus.

Consequently, the placement and routing tool needs to maintain an accurate representation of the array timing, and needs to be able to produce a timing representation of a signal using an arbitrary route between two arbitrary processor elements for use in step 107 of FIG. 3. This timing also needs to take into account the possibility of device redundancy (as described in UK Patent no. 2391083).

To overcome the speed penalty in performing the calculations of the time taken to traverse a route, the tool maintains a cache that stores predetermined values for the number of clock cycles required to transfer data between two processors. In a preferred embodiment, the minimum number of clock cycles is stored, each corresponding to a minimum distance route between the processor elements. In alternative embodiments, further values can be cached for non-minimum distance routes.

When producing a load file for a design it will not be known whether the device that will be used will be a "perfect" device or a device that contains faults that must be handled using redundancy.

In the placement and routing tool, part of a processor array 2 (such as a row, column or site of processor elements) can be labeled as being redundant. This means that during the placement phase, processes will not be placed on these processor elements.

During routing of the signals, the possibility of processor elements being in different relative positions must be dealt with, and the worst case timing used for each signal. For example, when row redundancy is being used, the vertical distance between two processor elements is not known exactly since the redundant row may actually lie between the source processor element and the destination processor elements. To allow the rapid timing for each different type of device, i.e. perfect, row redundant, site redundant, it is necessary to have a separate sustain timing cache for each situation.

There is therefore provided a method and apparatus for determining the routing of signals in a time-division multiplexed switching architecture.

Although the invention has been described in the form of a method or algorithm, it will be appreciated that the invention can be embodied as a computer program or as suitably programmed hardware.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A method for determining the routing for a plurality of signals in a processor array, the processor array comprising a plurality of processor elements interconnected by a network of switches, each of the plurality of signals having a respective source processor element and at least one destination processor element in the processor array, the method comprising:
   (i) identifying a signal from a plurality of unrouted signals to route;
   (ii) identifying a candidate route for the signal from the plurality of unrouted signals from the source processor element to the destination processor element, the candidate route using a first subset of switches comprising at least one switch in the network of switches;
   (iii) evaluating the candidate route by determining whether there are offset values that allow the signal from the plurality of unrouted signals to be routed through the first subset of switches; and
   (iv) attempting to route the signal from the plurality of unrouted signals using one of the offset values identified in step (iii),
   wherein each switch in the first subset of switches has an associated routing table that includes entries for each signal to be routed through said switch during the operation of the processor array, and each entry for said signal in the routing table comprises a rate of transfer for the signal that identifies how often the signal is repeated, the offset at which the signal is routed and/or the number of clock cycles required to complete the transfer, wherein step (iv) further comprises: attempting to route the signal from the plurality of unrouted signals using an offset value selected from the values identified in step (iii), such that fragmentation of the routing tables is minimised.

2. The method as claimed in claim 1, wherein, in the event that the signal is routed using one of the offset values identified in step (iii), returning to step (i) and identifying the next signal to route.

3. The method as claimed in claim 1, wherein step (i) comprises ordering the plurality of unrouted signals by a measure of the routability of each signal from the plurality of unrouted signals, and identifying a signal that is the least routable.

4. The method as claimed in claim 3, wherein the measure of the routability of said each signal from the plurality of unrouted signals' routability comprises a routability score that is calculated by:
   estimating a bandwidth required for each signal from the plurality of unrouted signals in the processor array; and
   adjusting the estimated bandwidth for each signal from the plurality of unrouted signals in accordance with a number of available candidate routes and/or a number of available offsets for each signal from the plurality of unrouted signals to give the routability score.

5. The method as claimed in claim 4, wherein identifying the signal that is the least routable comprises identifying a signal that has the highest routability score.

6. The method as claimed in claim 1, wherein the candidate route comprises a minimum distance route between the source processor element and the destination processor element.

7. The method as claimed in claim 6, wherein, if the minimum distance route between the source processor element and the destination processor element is unavailable, the candidate route comprises a route that is equal in length to a minimum distance route plus one switch.

8. The method as claimed in claim 1, wherein each switch in the network of switches has an associated routing table that includes entries for each signal in said plurality of signals to be routed through that switch during the operation of the processor array.

9. The method as claimed in claim 8, wherein step (iii) comprises examining the routing tables of each switch in the candidate route, and identifying one or more offset values that are available in each of the routing tables.

10. The method as claimed in claim 1, wherein step (iii) further comprises analysing the timing of the candidate route to determine the number of clock cycles required for the signal to be routed.

11. The method as claimed in claim 1, wherein step (iii) further comprises:
    in the event that there are no offset values that allow the signal to be routed, returning to step (ii) and identifying a further candidate route, the further candidate route using a second subset of switches comprising at least one switch in the network of switches.

12. The method as claimed in claim 11, wherein a limit is placed on the number of further candidate routes that can be considered.

13. The method as claimed in claim 1, wherein step (iv) further comprises:
    in the event that the signal cannot be routed using any one of the offset values identified in step (iii), returning to step (ii) and identifying a further candidate route, the further candidate route using a third subset of switches comprising at least one switch in the network of switches.

14. A method for determining the routing for a plurality of signals in a processor array, the processor array comprising a plurality of processor elements interconnected by a network of switches, each of the plurality of signals having a respective source processor element and at least one destination processor element in the processor array, the method comprising:
   (i) identifying a signal from a plurality of unrouted signals to route;
   (ii) identifying a candidate route for the signal from the plurality of unrouted signals from the source processor element to the destination processor element, the candidate route using a first subset of switches comprising at least one switch in the network of switches;
   (iii) evaluating the candidate route by determining whether there are offset values that allow the signal from the plurality of unrouted signals to be routed through the first subset of switches; and (iv) attempting to route the signal from the plurality of unrouted signals using one of the offset values identified in step (iii),
wherein the signal from the plurality of unrouted signals has an associated rate of transfer that identifies how often the signal is repeated.

15. The method as claimed in claim 14, wherein step (iv) comprises:
attempting to route the signal from the plurality of unrouted signals using an offset value selected from the values identified in step (iii), the offset value being selected in response to the rate of transfer of the signal.

16. The A method as claimed in claim 15, wherein step (iv) comprises preferably selecting an offset value from a first subset of the possible offset values if the rate of transfer is above a predetermined threshold.

17. A method for determining the routing for a plurality of signals in a processor array, the processor array comprising a plurality of processor elements interconnected by a network of switches, each of the plurality of signals having a respective source processor element and at least one destination processor element in the processor array, the method comprising:
(i) identifying a signal from a plurality of unrouted signals to route;
(ii) identifying a candidate route for the signal from the plurality of unrouted signals from the source processor element to the destination processor element, the candidate route using a first subset of switches comprising at least one switch in the network of switches;
(iii) evaluating the candidate route by determining whether there are offset values that allow the signal from the plurality of unrouted signals to be routed through the first subset of switches; and
(iv) attempting to route the signal from the plurality of unrouted signals using one of the offset values identified in step (iii),
wherein each switch in the first subset of switches has an associated routing table that includes entries for each signal to be routed through said switch during the operation of the processor array, wherein each entry for a signal in the routing table comprises a rate of transfer for the signal that identifies how often the signal is repeated, the offset at which the signal is routed and/or the number of clock cycles required to complete the transfer.

18. A method for determining the routing for a plurality of signals in a processor array, the processor array comprising a plurality of processor elements interconnected by a network of switches, each of the plurality of signals having a respective source processor element and at least one destination processor element in the processor array, the method comprising:
(i) identifying a signal from a plurality of unrouted signals to route;
(ii) identifying a candidate route for the signal from the plurality of unrouted signals from the source processor element to the destination processor element, the candidate route using a first subset of switches comprising at least one switch in the network of switches;
(iii) evaluating the candidate route by determining whether there are offset values that allow the signal from the plurality of unrouted signals to be routed through the first subset of switches; and
(iv) attempting to route the signal from the plurality of unrouted signals using one of the offset values identified in step (iii),
wherein each switch in the first subset of switches has an associated routing table that includes entries for each signal to be routed through said switch during the operation of the processor array, wherein step (iv) comprises:
attempting to route the signal from the plurality of unrouted signals using an offset value selected from the values identified in step (iii), such that fragmentation of the routing tables is minimised.

19. The method as claimed in claim 18, wherein fragmentation of the routing tables is minimised by selecting an offset value that is close to one or more offset values that have already been assigned to signals from the plurality of signals.

20. The method as claimed in claim 18, wherein step (iv) comprises:
assigning a score to each of the offset values identified in step (iii), the score indicating the proximity of each offset value to offset values already assigned to other signals from the plurality of signals; and selecting an offset value with a score that indicates that the offset value is proximate to offset values already assigned to other signals from the plurality of signals.

21. A method for determining the routing for a plurality of signals in a processor array, the processor array comprising a plurality of processor elements interconnected by a network of switches, each of the plurality of signals having a respective source processor element and at least one destination processor element in the processor array, the method comprising:
(i) identifying a signal from a plurality of unrouted signals to route;
(ii) identifying a candidate route for the signal from the plurality of unrouted signals from the source processor element to the destination processor element, the candidate route using a first subset of switches comprising at least one switch in the network of switches;
(iii) evaluating the candidate route by determining whether there are offset values that allow the signal from the plurality of unrouted signals to be routed through the first subset of switches; and
(iv) attempting to route the signal from the plurality of unrouted signals using one of the offset values identified in step (iii),
wherein step (iii) further comprises analysing a timing of the candidate route to determine a number of clock cycles required for the signal from the plurality of unrouted signals to be routed, wherein analysing the timing of the candidate route comprises looking up the candidate route in a sustain cache that stores the number of clock cycles required for routes between different source and destination processor elements.

22. A method for determining the routing for a plurality of signals in a processor array, the processor array comprising a plurality of processor elements interconnected by a network of switches, each of the plurality of signals having a respective source processor element and at least one destination processor element in the processor array, the method comprising:
(i) identifying a signal from a plurality of unrouted signals to route;
(ii) identifying a candidate route for the signal from the plurality of unrouted signals from the source processor element to the destination processor element, the candidate route using a first subset of switches comprising at least one switch in the network of switches;
(iii) evaluating the candidate route by determining whether there are offset values that allow the signal from the plurality of unrouted signals to be routed through the first subset of switches; and (iv) attempting to route the signal from the plurality of unrouted signals using one of the offset values identified in step (iii), wherein step (iii) further comprises:

in the event that there are no offset values that allow the signal from the plurality of unrouted signals to be routed, returning to step (ii) and identifying a further candidate route, the further candidate route using a second subset of switches comprising at least one switch in the network of switches, wherein a limit is placed on the number of further candidate routes that can be considered, wherein if the limit is reached without successfully routing the signal from the plurality of unrouted signals, the method further comprises the steps of:

(v) identifying a candidate route for the failed signal;

(vi) identifying a competing signal by examining each switch in the candidate route;

(vii) removing the competing signal and repeating steps (iii) and (iv) for the failed signal.

23. The method as claimed in claim 22, wherein, if the failed signal still cannot be routed, repeating steps (vi) and (vii) for a further competing signal.

24. The method as claimed in claim 22, wherein, if the failed signal is routed successfully, repeating steps (ii), (iii) and (iv) for the competing signal or signals.

* * * * *